United States Patent [19]

Chombard

[11] 3,807,238
[45] Apr. 30, 1974

[54] FAULT WARNING DEVICES FOR GYROSCOPIC INSTRUMENTS

[75] Inventor: Pierre A. Chombard, Boulogne-sur-Seine, France

[73] Assignee: Societe Francaise D'Equipments Pour La Navigation Aerienne S.F.E.N.A., Velizy-Villacoublay, Yvelmes, France

[22] Filed: Apr. 10, 1972

[21] Appl. No.: 242,372

[30] Foreign Application Priority Data
Apr. 30, 1971   France .............................. 71.15707

[52] U.S. Cl. .................................. 74/5.7, 340/263
[51] Int. Cl. ............................................ G01c 19/04
[58] Field of Search ....... 74/5 R, 5.7; 340/263, 264; 318/490; 324/174, 161, 163

[56] References Cited
UNITED STATES PATENTS
2,315,019   3/1943   Samuelson ......................... 340/263
2,589,873   3/1952   Seifried ................................ 74/5.7
2,979,707   4/1961   Seifried et al. ...................... 74/5.7 X
3,146,433   8/1964   Humburt ............................ 340/263
2,664,558   12/1953   Konet ................................ 340/253

FOREIGN PATENTS OR APPLICATIONS
717,322   6/1952   Great Britain ......................... 74/5.7

Primary Examiner—Manuel A. Antonakas
Attorney, Agent, or Firm—Karl W. Flocks

[57] ABSTRACT

An improvement to fault-warning devices for gyroscopic instruments which consists in an indicator of the speed of the gyroscope rotor. Said speed indicator is constituted by a flag fully visible at rest, gradually disappearing when said rotor runs up to speed and gradually reappearing when said rotor slows down. The invention may be applied, more particularly, to fault warning devices having a power fault indicator.

3 Claims, 3 Drawing Figures

PATENTED APR 30 1974 3,807,238

FAULT WARNING DEVICES FOR GYROSCOPIC INSTRUMENTS

Gyroscopic horizons are instruments which indicate to aircraft pilots the true vertical essential for checking the trim of the aircraft for rolling and pitching, when the external visibility is bad or zero.

They are essentially constituted by a gyroscope with a vertical axis suspended on gimbals and a member responsive to the apparent gravity which acts slowly on the gyroscope in order to maintain its axis directed along the true vertical. This reference vertical is indicated to the pilot, for his convenience in use, by a system which generally comprises a fixed member parallel to the wings of the aircraft and a rod or generatrices of a cylinder coupled to the suspension of the gyroscope, the relative displacements of which suggest the movements of the aircraft in pitching or rolling.

Gyroscopic horizons are utilized either as a stand-by, due to their great reliability, on large aircraft which have very complex piloting equipments utilizing gyroscopic stations, or as main instruments on more economical aircraft.

In all cases, they constitute a fundamental element in the safety of flight and efforts have been made to develop their safety and duration of operation to the highest possible degree.

They are generally provided with an alarm device also known as a fault-warning device, intended to warn the pilot in the event of incorrect operation of the instrument. The most serious faults concern the gyroscope, the stopping of which inevitably involves the putting out of use of the instrument. The other faults have generally a less radical effect on the indications of the instrument, causing only slow alterations in the vertical, which the pilot is able to detect by the indications of the other piloting instruments. In the present case, electric gyroscopic horizons are especially concerned.

The fault-warning devices most frequently employed indicate a fault in the electric supply to the gyroscope, and some of them give in addition an indication of internal interruption in the electric circuits resulting either from the breakage or unsoldering or a wire, or from a bad contact in the fixed or rotating parts which ensure the passage of the current to the interior of the instrument.

These faults are indicated to the pilot by the appearance in the dial of the instrument of a small flag, generally red, fixed on the shaft of a small electric motor: electro-magnet, galvanometer, two-phase motor, connected to the electric circuit. When this small motor is supplied, it drives the warning flag outside the visible part of the dial, against the action of an opposing spring. If the small motor is no longer supplied the flag reappears in the dial, due to the action of the spring. These movements of disappearance or appearance of the flag are very rapid.

This kind of system however has certain disadvantages:

1. If the motor of the fault indicator device is simply connected in parallel on the electric voltage at the input of the instrument, it is clear that it cannot give any indication of faults in the internal electric circuit. More serious still, upon the application of voltage the flag disappears even if the gyroscope does not start-up, for example due to a mechanical cause such as the destruction of a bearing.

2. If the fault-warning motor is traversed by the very current which circulates in the motor of the gyroscope, the result is better but, on the one hand, as in the previous case, a mechanical blocking of the gyroscope is not indicated and on the other hand there remains a further disadvantage which necessitates a more detailed analysis for its explanation.

The most generally-employed gyroscopes utilize electric motors with a rotating field, either asynchronous with a squirrel cage or synchronous in the so-called hysteresis types. Their supply voltage is either three-phase, permitting direct production of the rotating field in the three-phase wound stator, or single phase, which then necessitates the introduction of a phase-shifting capacitor in order to create the rotating field in the two-phase stator winding.

In both cases, a known solution for the fault-warning motor consists of the use of a small two-phase motor, the two separate windings of which are connected in series in two of the three wires which lead the current to the stator of the gyroscope.

This device enables an indication to be given, not only of the absence of supply to the instrument, but also, as stated above, of an interruption of any kind in the internal electric circuit of the instrument.

The subsisting disadvantage referred to above resides in the well known fact that the interruption of the current in one of the phases of a gyroscope motor with a rotating field does not necessarily involve the stoppage of the gyroscope when this interruption occurs during normal working. There thus exists a gyroscopic horizon which continues to work, whereas the appearance of the fault-warning flag prohibits the pilot from continuing to use it. This is particularly true in the case of gyroscopic horizons in which the mechanical erector which takes its movement from that of the rotor continues to operate perfectly.

To sum-up, the case considered is that of a real fault which prevents the gyroscope from re-starting after being stopped, but which does not prevent the use of the instrument after the appearance of the flag during the course of operation.

The fault-indicator considered is too summary to take these phenomena into account.

An object of the invention is to provide an addition element to the fault-indicators which fulfill the same functions as those of the second type described above by way of example, since other solutions, also based on the utilization of the currents flowing in the gyroscope motor may lead to the same results. For reasons of convenience the warning flag of these devices will be mentioned later on as the power flag because this expression, while not being strictly correct, has already passed into common use.

According to the invention, the addition element in question consists of a second flag fixed on the shaft of a galvanometer supplied by a current generated by the rotation of the gyroscope. The electrical energy thus employed is solely derived from the kinetic energy of the gyroscope.

The use of a sensitive galvanometer limits this derivation of energy to a very small value, which has preactically no appreciable influence on the starting-up, the normal speed and the stopping time of the gyroscope.

In the remainder of the description which follows, the second flag will be called the speed flag also for the sake of convenience.

This latter flag driven by a galvanometer fed from an electric current proportional to the speed of the gyroscope, has slow displacements which correspond to the variations in speed of the rotor.

When stopped, this flag is fully visible. When starting-up, it gradually disappears as and when the rotor runs-up to speed. Matters can be so arranged that it disappears completely above a certain speed close to the normal speed. On starting-up, there is therefore available a check on the good condition of the gyroscope. If the gyroscope slows down for any reason, electrical or mechanical, the flag begins to reappear substantially at the same speed, and its progressive appearance corresponds to the slowing-down of the speed of the rotor.

An appropriate reference mark provides an indication to the pilot of the minimum speed below which the instrument can no longer be considered as giving correct information.

It may be checked that the joint use of the power flag of the second type and the speed flag permits complete identification of the nature of the serious faults which have been referred to above, and enables the pilot to take full advantage of his instrument.

The invention may of course be applied to all gyroscopic instruments comprising a dial utilized by a pilot in piloting an aircraft of any kind.

A particular arrangement of a speed flag according to the invention is described below by way of example in its application to a gyroscopic horizon with a drum figuration, reference being made to the accompanying drawings, in which.

Figure 1:
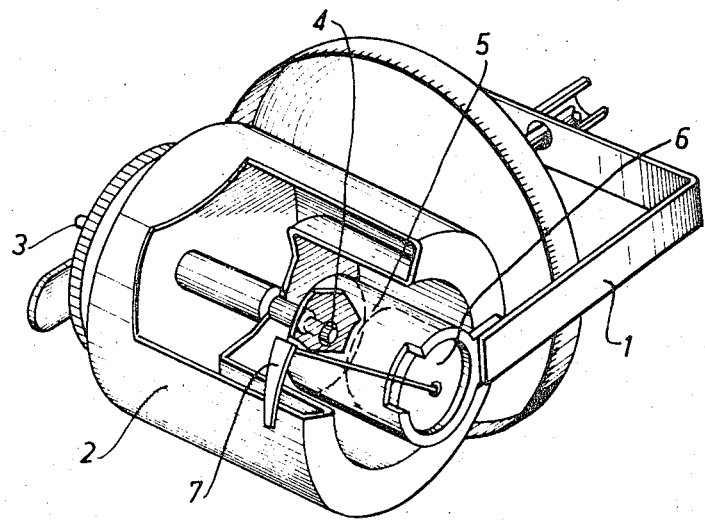
FIG. 1 is a perspective view with parts broken away of the indicator drum of the gyroscope.

The flag-carrier galvanometer is mounted inside the drum as shown in FIG. 1. It is rigidly fixed to the fork strap 1 in which is pivoted the drum 2, one of the bearings 3 of which is directly housed in the fork strap and the second 4 in a support 5 on which is fixed the galvanometer 6.

Figure 2:
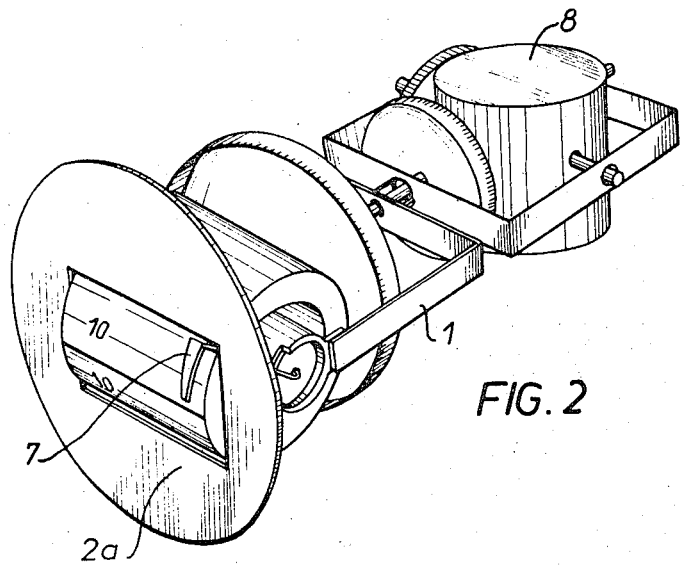
FIG. 2 is a perspective view of the whole of the gyroscope with its indicator drum.

The flag 7 mounted on the shaft of the galvanometer appears in the dial on the edge of the drum, from which it is clearly distinguished (see FIG. 2).

In the absence of supply current, the flag is plainly seen due to the action of the spiral spring on the galvanometer. At speed, it has completely disappeared behind the metal sheet 2a, fixed on the fork 1, in the cut-out portion of which is seen the indicator drum 2 of the gyroscope 8.

Figure 3:
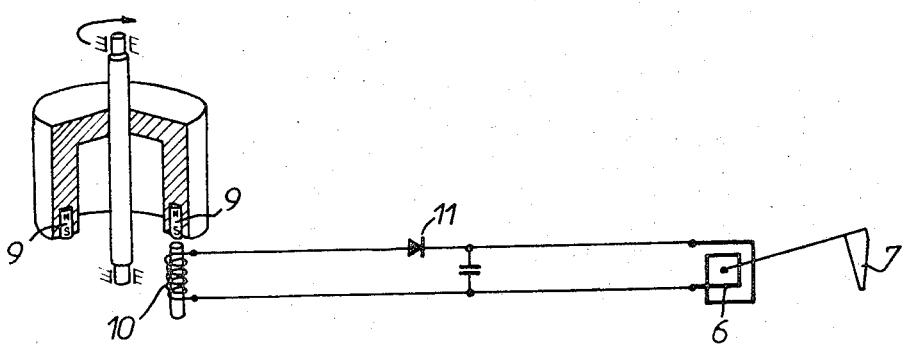
FIG. 3 is an electrical diagram.

The electric voltage utilized is generated by one or a number of small permanent magnets 9 fixed on the periphery of the gyroscope rotor, which pass in front of a small coil 10 fixed on the rotor casing. The pulsating voltage which appears at the terminals of the small detector coil is proportional to the speed of the rotor. This voltage is rectified by the diode 11 and fed directly to the galvanometer 6 of the speed flag, the current passing along the suspension shafts of the gyroscope by conventional rotary contacts such as those which supply the stator of the gyroscope itself (see FIG. 3).

It will of course be understood that the present invention has only been described and illustrated by way of a preferred example, and that equivalents may be made in its constituent parts without thereby departing from the scope of the said invention, as defined in the appended claims.

Thus, the fault-warning device according to the invention, which has been described as an addition element to that which is already known on electric gyroscopes, may be perfectly well applied solely to gyroscopes in which the rotation is maintained by other means, for example to pneumatic gyroscopes.

I claim:

1. In a gyroscopic instrument fault warning device having at least a gyroscopic rotor and a dial, means supplying a current generated by the rotation of said rotor forming a part of said rotor, electrical means supplied by said current, and a flag adjacent said dial and actuated by said electrical means whereby said flag gradually disappears from said dial when said rotor runs-up to speed and gradually reappears in said dial when said rotor slows-down.

2. Fault-warning device according to claim 1 in which said means generating an electric current comprise a detecting coil, at least a permanent magnet fixed on said gyroscope rotor passing in front of said coil and a diode, whereby the electric energy thus employed is derived from the kinetic energy of said gyroscope rotor.

3. A fault warning device in accordance with claim 1, further characterized by
said electrical means including a sensitive galvanometer having said flag affixed thereto to move in relation to said dial depending upon the speed of said gyroscopic rotor.

* * * * *

UNITED STATES PATENT OFFICE
CERTIFICATE OF CORRECTION

Patent No. 3,807,238　　　　　　　　　Dated April 30, 1974

Inventor(s)　Pierre A. CHOMBARD

It is certified that error appears in the above-identified patent and that said Letters Patent are hereby corrected as shown below:

Title page, line [73] should read as follows:

Assignee: SOCIETE FRANCAISE D'EQUIPEMENTS
              POUR LA NAVIGATION AERIENNE
              S.F.E.N.A., Velizy-Villacoublay,
              Yvelines, France Sign and sealed this 10th day of September 1974.

(SEAL)
Attest:

McCOY M. GIBSON, JR.　　　　　　　　C. MARSHALL DANN
Attesting Officer　　　　　　　　　　Commissioner of Patents